United States Patent [19]

Ilenda et al.

[11] Patent Number: 4,997,884

[45] Date of Patent: Mar. 5, 1991

[54] POLYOLEFIN COMPOSITIONS WITH IMPROVED IMPACT STRENGTH

[75] Inventors: Casmir S. Ilenda, Hulmevill; David L. Dunkelberger, Newtown; Dennis J. Labanoski, Levittown, all of Pa.

[73] Assignee: Rohm and Haas Company, Philadelphia, Pa.

[21] Appl. No.: 413,824

[22] Filed: Sep. 28, 1989

Related U.S. Application Data

[63] Continuation-in-part of Ser. No. 315,501, Mar. 1, 1989, Pat. No. 4,957,974.

[51] Int. Cl.$^5$ .............................................. C08L 51/00
[52] U.S. Cl. ........................................ 525/71; 525/80; 525/301
[58] Field of Search ................................... 525/71, 80

[56] References Cited

U.S. PATENT DOCUMENTS

| | | | |
|---|---|---|---|
| 3,886,227 | 5/1975 | VanBrederode et al. | 525/80 |
| 4,555,546 | 11/1985 | Patel | 525/80 |
| 4,595,726 | 6/1986 | Klosiewicz | 525/71 |
| 4,831,079 | 5/1989 | Ting | 525/71 |
| 4,842,947 | 6/1989 | Jachec et al. | 525/71 |

Primary Examiner—Melvyn I. Marquis
Assistant Examiner—Vasu S. Jagannathan
Attorney, Agent, or Firm—Jordan J. Driks

[57] ABSTRACT

The addition of a polyolefin-acrylic graft copolymer to blends of polyolefin and core-shell polymers improves compatibility and allows core-shell polymers to be used as processing and performance modifiers pololefins. Generally the compatibilizing additive is a graft copolymer of a polyolefin and a methacrylate. More specifically, the graft copolymer is derived from at least about 80% of a monomer of a methacrylic ester of the formula $CH_2=C(CH_3)COOR$, where R may be alkyl, aryl, or aralkyl, substituted or unsubstituted, and less than 20%, based on a total monomer weight, off an acrylic or styrenic monomer copolymerizable with the methacrylic ester grafted on to a non-polar polyolefin trunk, so that at least one chain is a polymer with a weight averge molecular weight greater than about 20,000 and is present in a weight ratio with the polyolefin trunk of from about 1:9 to about 4:1.

A typical composition may contain about 20% core-shell modifier, about 10% compatibilizer, the balance being polyolefin.

13 Claims, No Drawings

POLYOLEFIN COMPOSITIONS WITH IMPROVED IMPACT STRENGTH

This application is a Continuation-In-Part of application Ser. No. 07/315,501, filed Mar. 1, 1989, now U.S. Pat. No. 4,957,974, the disclosure of which is incorporated by reference herein.

BACKGROUND OF THE INVENTION

1. Field of the Invention

This invention pertains to polyolefins with improved impact strength, obtained by the addition of core-shell polymers compatibilized to the polyolefin matrix via the addition of a polyolefin-acrylic graft copolymer.

2. Description of Related Art

Polyolefins are widely used as general purpose resins, however, from the perspective of practical physical properties, suffer from having low impact strength.

Core-shell polymers are known as useful additives for certain plastics, providing both processing and end use benefits. As processing additives the core-shell polymers allow the melt to be processed more quickly and with better consistency by improving the melting and increasing the melt strength. As performance additives the core-shell polymers increase the impact strength of plastics.

However, it has not been possible to use core-shell polymers in polyolefins since the polyolefins are non-polar and are, therefore, non-compatible with the polar core-shell polymers.

U.S. patent application Ser. No. 315,501, of common ownership herewith, describes the preparation of novel grafted copolymers capable of imparting to polyolefins when blended therewith high tensile modulus and high sag resistance. The graft copolymers of this disclosure are polyolefins having a relatively high weight average molecular weight methacrylate polymer grafted thereto.

Fayt and Teyssie in *Polymer Engineering and Science*, Apr. 1989, Volume 29, Number 8, pages 538 to 542, disclosed the emulsifying activity of a copolymer of poly (hydrogenated butadiene-β-methyl methacrylate) as an emulsifier for blends of low density polyethylene and polystyrene coacrylonitrile resins.

U.S. Pat. No. 4,430,477 discloses high impact polypropylene compositions comprising polypropylene and a chlorinated polyolefin having styrene graft polymerized thereon.

U.S. Pat. No. 4,156,703 discloses the blending of a polyolefin, namely polyethylene with an acrylic polymer to form a heterogeneous mixture, which has improved processing characteristics.

U.S. Pat. No. 4,180,494 discloses a core-shell polymer comprising about 25 to 95% by weight of an aromatic polyester, about 1 to 8% by weight of an aromatic polycarbonate, and a balance to make 100% of the core-shell polymer having a butadiene based core.

U.S. Pat. No. 4,443,585 discloses polymer impact modifiers used especially for PVC. The impact modifiers of this disclosure are comprised of an olefin and an acrylic copolymer.

U.S. Pat. No. 3,808,180 discloses modified rigid acrylic thermoplastic resin comprising at least 50 weight percent alkyl or aralkyl acrylate, crosslinking and hydrophilic monomers. These materials may be characterized as soft-core hard-shell polymers.

U.S. Pat. No. 3,793,402 discloses an impact resistant thermoformable composition comprising a blend of a thermoplastic polymer and a hard-soft-hard core additive.

U.S. Pat. No. 4,617,329 discloses a core-shell polymer wherein the core is polymerized from a styrenic monomer. The second stage comprises a polymeric soft stage with a rigid thermal plastic outer stage.

The disclosures of the foregoing patents and publications are incorporated by reference herein. It is the object of this invention to incorporate the core-shell polymers as described above into polyolefins.

SUMMARY OF THE INVENTION

The addition of a polyolefin-acrylic graft copolymer to blends of polyolefin and core-shell polymers improves compatibility and allows core-shell polymers to be used as processing and performance modifiers in polyolefins. Generally the compatibilizing additive is a graft copolymer of a polyolefin and a methacrylate. More specifically, the graft copolymer is derived from at least about 80% of a monomer of a methacrylic ester of the formula $CH_2=C(CH_3)COOR$, where R may be alkyl, aryl, or aralkyl, substituted or unsubstituted, and less than 20%, based on a total monomer weight, of an acrylic or styrenic monomer copolymerizable with the methacrylic ester grafted on to a non-polar polyolefin trunk, so that at least one chain is a polymer with a weight average molecular weight greater than about 20,000 and is present in a weight ratio with the polyolefin trunk of from about 1:9 to about 4:1.

A typical composition may contain about 20% core-shell modifier, about 10% compatibilizer, the balance being polyolefin.

DETAILED DESCRIPTION OF THE INVENTION

The preparation of the compatibilizing additives useful in this invention is described in detail in U.S. Ser. No 315,501, the disclosure of which is incorporated by reference herein.

Briefly, the additive useful in this invention is prepared by grafting onto a non-polar polyolefin trunk in solution, at least one chain which is of a polymer having a weight average molecular weight (Mw) of from about 20,000 to about 200,000 and present in a weight ratio with the polyolefin of from about 1:9 to about 4:1.

The molecular weight of the polyolefin polymer which forms the trunk of the graft copolymer should be high enough to give a large amount of non-polar polymer when grafted, but low enough so that most of the graft copolymer has one acrylic polymer chain grafted to each polyolefin trunk chain. The trunk may have a molecular weight between about 50,000 and 1,000,000. The trunk may also have a molecular weight of about 100,000 to 400,000. A polyolefin trunk having a molecular weight of about 200,000–800,000Mw is especially preferred, but polyolefins having a molecular weight of about 50,000–200,000 can be used with some beneficial effect.

In using the compatibilizing additives of this invention it is possible to melt-mix all three components, i.e. the polyolefin, the core-shell modifier and the compatibilizer simultaneously in an extruder. Alternatively the compatibilizer and the modifier may be melt-mixed and then added to the polypropylene or other polyolefin. Or a blend of the modifier and the compatibilizer may be added to the molten polypropylene.

In the practice of this invention compatibility is used as a criterion for determining if an acceptable mixture has been produced. Compatible polymers tend to form blends that contain small domains of the individual polymers; in the case of miscible polymers these occur at the molecular scale resulting in properties usually considered characteristic of a single polymer. These may include occurrence of a single glass transition temperature and optical clarity. Such blends are frequently termed alloys.

Compatible polymers that are not strictly miscible, as described above, nevertheless tend to form blends with properties that approach those of the miscible blends. Such properties as tensile and impact strength, which rely upon adhesion of the domains to one another, tend not to be degraded when compatible polymers are blended.

Poor compatibility cannot necessarily be predicted accurately for a given polymer combination, but in general it may be expected when non-polar polymers are blended with more polar polymers. Poor compatibility in a blend is apparent to those skilled in the art, and often evidences itself in poor tensile strength or other physical properties, especially when compared to the component polymers of the blend. Microscopic evidence of poor compatibility may also be present, in the form of large, poorly-adhered domains of one or more polymer components in a matrix of another polymer component of the blend. More than one glass transition temperature may be observed, and a blend of otherwise transparent polymers may be opaque because the domain sizes are large enough to scatter visible light. As a rule of thumb, 5 micron particles are an indication of incompatibility. The incompatibility will often be manifested by delamination of the materials in preparation. When the domain sizes are on the order of 0.5 micron or less, compatibility has been achieved.

Among the olefins which are expected to benefit from application of this compatiblizing technology are polyethylene, polypropylene, poly-1-butene, poly-methylpentene, EPDM terpolymers and copolymers of the above. It is also expected that mixtures of these polymers in normal ratios would be suitable in the practice of this invention.

Among the core-shell modifiers which are expected to find use in this invention are MBS and acrylic modifiers, such as butadiene/methyl methacrylate and butyl acrylate/methyl methacrylate materials. Typically the composition may contain anywhere from 0.1 to 40 parts of core-shell modifier. The ratio of graft copolymer compatibilizer to modifier will generally be in the range of about 1:10 to about 1:1.

The products may be isolated by stranding, cooling, chopping, drying and bagging or other known collection techniques. Optionally the blend of polyolefin, impact modifier, and compatibilizer may be further modified by the introduction of fillers, both organic and inorganic, fibers, other impact modifiers, colorants, stabilizers, flame-retardants, and or blowing agents.

The blend of polyolefin, impact modifier and compatibilizing additive is useful in thermo-forming, film-making (especially blowing and extruding), blow-molding, fiber-spinning, foaming, extrusion (sheet, pipe, and profile), co-extrusion (multi-layer film, sheet, preforms, and parisons, with or without the use of tie-layers), hot-melt adhesives, calendering, and extrusion coating (for the preparation of polymer/fabric, carpet, foil, and other multi-layer constructions).

When polypropylene is modified with the core-shell modifier and compatibilizing additives of this invention, the resultant mixture may be employed in the manufacture of many useful objects, such as extrusion or injection-blown bottles for the packaging of food-stuffs, aqueous solutions such as intravenous feeds, hot-filled items such as ketchup, or extruded articles in profile forms such as clips, scrapers, window and door casings and the like. Foamed articles may be used as substitutes for wood in moldings, for packaging materials, for insulation or sound-deadening materials, for food containers, and other rigid article applications. Films may be used in many protective or wrapping applications such as food packaging, blister packaging of consumer goods, and the like.

The compositions of this invention are also useful in preparation of polyolefin fibers, especially polypropylene fibers. Polypropylene may be formed into fibers by slitting tape from extruded film to form high denier, coarse fibers; by extruding monofilaments into large denier fibers with a controlled cross-sectional size, or by extruding multifilaments through a spinerette to produce bundles of small denier fibers. In all cases, the fibers may be draw-textured.

The following examples are intended to illustrate the present invention and should not be construed as limiting the invention to less than that specified by the claims. All percentages are by weight unless otherwise specified and all reagents are of commercial quality.

EXAMPLE 1.

Preparation of Graft Copolymer of Methyl Methacrylate, Ethyl Acrylate and EPDM.

An EPDM-acrylic graft copolymer was made by polymerizing an 8% ethyl acrylate-92% methyl methacrylate monomer mixture in the presence of an equal amount of EPDM (a copolymer of ethylene, propylene, and a non-conjugated diene, such as 1,4 hexadiene). Radicals were generated from di-tertiary-butyl peroxide (DTBPO) at the rate of 0.00017 mols per liter per minute (radical flux). Monomer and initiator were fed over 30 minutes. The theoretical (100% conversion) solids at the end of the reaction is 55%.

A 1.7 gallon reactor equipped with a double helical agitator (115 RPM) was charged with 1780 grams of Isopar E (an inert aliphatic hydrocarbon solvent mixture) and heated to 150° C. Eleven hundred grams of an EPDM polymer (DuPont Nordel 2722) was fed to the reactor via melt extruder set at 150° C. at a rate of about 10 grams per minute. After holding for 45 minutes at 170° C. the addition of monomer and initiator solutions was begun. Over a 2 minute period two solutions were added. The first consisted of 1.9 gram of di-t-butyl peroxide in 20 gram of Isopar E. The second consisted of 0.07 gram of di-t-butyl peroxide in 5.9 gram of ethyl acrylate and 68 grams of methyl methacrylate. Over the next 28 minutes, 0.99 grams of di-t-butyl peroxide and 82 grams of ethyl acrylate in 946 grams of methyl methacrylate were added.

This feed schedule results in a radical flux of 0.00017 during the feed. After the feed was complete the reaction was held at 150° C. for an additional 15 minutes. It was then devolatilized by passing through a 30 mm Werner-Pfleiderer extruder with vacuum vents at 200°–250° C. The elemental analysis (carbon content) showed that the composition was 44% acrylate and 56% EPDM.

EXAMPLE 2.

Preparation of Graft Copolymer of Polypropylene, Methyl Methacrylate, and Ethyl Acrylate.

A polypropylene-acrylic graft copolymer was made by polymerizing a 5% ethyl acrylate-95% methyl methacrylate monomer mixture in the presence of polypropylene (weight ratio of polypropylene to monomer equals 0.67 to 1. Radicals were generated from di-t-butyl peroxide at the rate of 0.00010 mols per liter per minute (radical flux). Monomer and initiator were fed over 60 minutes and the theoretical (100% conversion) solids at the end of the reaction is 55%.

A 1.7 gallon reactor equipped with a double-helical agitator (115 RPM) was charged with 1780 grams of isopar E and 880 grams of polypropylene (Himont 6523) and heated to 175° C. After two hours the temperature was decreased to 155° C. and the batch was stirred for one additional hour. Over a 2-minute period two solutions were added. The first consisted of 1.03 grams of di-t-butyl peroxide in 21 grams of Isopar E. The second consisted of 0.06 grams of di-t-butyl peroxide in 2.1 gram of ethyl acrylate and 42 gram of methyl methacrylate. Over the next 58 minutes, 1.87 gram of di-t-butyl peroxide and 62 gram of ethyl acrylate in 1215 gram of methyl methacrylate were added. This feed schedule resulted in a radical flux of 0.00010 during the feed time.

After the feed was complete, the reaction was held at 155° C. for an additional 15 minutes. It was then devolatilized by passing through a 30 mm Werner-Pfleiderer extruder with vacuum vents at 200° to 250° C. Elemental analysis showed that the composition was 56% acrylate and 44% polypropylene.

EXAMPLE 3.

Preparation of Graft Copolymer of Polypropylene, Methyl Methacrylate, and Ethyl Acrylate A polypropylene-acrylic graft copolymer was made by polymerizing a 5% ethyl acrylate-95% methyl methacrylate monomer mixture in the presence of polypropylene (weight ratio of polypropylene: monomer=0.67:1). Radicals are generated from di-t-butyl peroxide at the rate of 0.000065 mols per liter per minutes (radical flux). Monomer and initiator are fed over 122 minutes and the theoretical 100% conversion solids at the end of the reaction is 47%.

A 100 gallon reactor equipped with a back-slope turbine agitator was charged with 225 pounds of Isopar E and 80 pounds of polypropylene (Hercules 6523PP) and heated to 150° C. over four hours. Two solutions were added over a 20-minute period. The first consisted of 82 gram of di-t-butyl peroxide in 826 gram of Isopar E. The second consisted of 1 pound of ethyl acrylate and 19 pounds of methyl methacrylate. An additional 82 grams of di-t-butyl peroxide and 82 grams of Isopar E were added over 90 minutes. At the same time, 5 pounds of ethyl acrylate and 95 pounds of methyl methacrylate were added over 102 minutes (ending 12 minutes after the initiator feed had finished). The reaction was held at 150° C. for an additional 15 minutes. Then an additional 50 pounds of Isopar E were pumped in over 30 minutes. The reaction mixture was then devolatilized by passing through a 0.8 inch Welding Engineer's twin screw extruder at 200 RPM and 200° to 250° C. over 14 hours.

Elemental analysis showed this copolymer to be 45% polypropylene and 55% acrylate.

EXAMPLE 4.

Blend of Polypropylene, Core-shell Modifier, and Compatibilizer of Example 1.

This example shows the effect of blending core-shell modifiers into polypropylene with compatibilizing additive.

Sixty grams of a copolymer, butadiene/methylmethacrylate (Rohm and Haas KM-680) and 30 gram of the EPDM-acrylic graft copolymer of Example 1 were blended on a 3 by 7 inch electric mill at 190° C. for 3 minutes after all material had fluxed. After this material had cooled, 30 grams of it were mixed with 70 grams of polypropylene (Himont 6523) on the mill at 190° C. for 3 minutes after flux. The material was then pressed in a 0.125×5×5 inch mold in a Farrel press at 190° C. and 75 tons pressure. The mold was then placed in a cooling press at 75 tons for 2 minutes. Notched Izod impact strength of a specimen cut from this sheet was 0.52 ft-lb/in.

EXAMPLE 5.

Blend of Polypropylene, Core-shell Modifier, and Compatibilizer of Example 2.

In a similar manner to that of Example 4, the graft copolymer of Example 2 was blended with polypropylene. The notched Izod impact strength of a specimen cut from this sheet was 0.46 ft-lb/in.

EXAMPLE 6.

Blend of Polypropylene and Core-shell Modifier.

A specimen was prepared with only core-shell polymer in polypropylene and the appearance of the blend indicated that these materials were not compatible. Notched Izod impact strength for a specimen cut from this sheet was only 0.34 ft-lb/in.

EXAMPLE 7.

Virgin Polypropylene

A sheet of an unmodified polypropylene control with no additives was prepared in a similar manner. A specimen of this sheet had a notched Izod impact strength of 0.41 ft lb/in.

EXAMPLE 8.

Blend of Polypropylene, Multi-stage Processing Aid, and Compatibilizer.

A blend of 10 grams of K120-ND melt processing aid and 35 grams of the polypropylene acrylic graft copolymer of Example 3 was prepared in the melt in a Haake Rheocord at 180° C. This mixture was then melt-blended with polypropylene, 2.25 grams of the mixture to 42.75 grams of polypropylene. A control blend of the K120-ND and polypropylene was similarly prepared.

Morphological observation via transmission electron microscopy showed that the K120-ND blend without the graft copolymer had very large irregular shaped domains of undispersed acrylic, typical of incompatible polymer blends.

The sample containing graft copolymer had far superior dispersion. The acrylic domains were spherical and varied in size from 0.1 to 0.5 microns, indicative of improved compatibility.

While this invention has been described with reference to specific examples and applications, other modifications and uses for the invention will be apparent to those skilled in the art without departing from the spirit and scope of the invention defined in the appended claims.

What is claimed is:

1. A polymer blend comprising:
   a. a polyolefin matrix;
   b. a core-shell polymeric modifier;
   c. a polyolefin-acrylic graft copolymer compatibilizer for enhancing the compatibility of components a and b, said polyolefin-acrylic graft copolymer comprising:
      (i) a non-polar polyolefin trunk selected from the group consisting of polyethylene, polypropylene, polybutylene, poly(4-methylpentene), copolymers of said olefins with each other, and one or more copolymers of said olefins with minor amounts of 1-alkenes, vinyl esters, vinyl chloride, (meth)acrylic ester, and (meth)acrylic acid, said trunk having a Mw of between about 50,000 and 1,000,000; and
      (ii) at least one methacrylate chain grafted with a covalent bond to said trunk having a weight ratio with said trunk of from about 1:9 to about 4:1, said chain being a polymer derived from at least about 80% of a monomer of a methacrylic ester of the formula $CH_2=C(CH_3)COOR$, where R is alkyl, aryl, substituted alkyl, substituted aryl, or substituted alkaryl, and less than about 20% of an acrylic or styrenic monomer copolymerizable with the methacrylic ester, said chain having a Mw of from about 20,000 to 200,000.

2. A polymer blend of claim 1 in which the compatibilizer is present in a concentration of from about 0.1% to about 40% by weight.

3. A polymer blend of claim 1 in which the core-shell polymer is present in a concentration of from about 0.1% to about 40% by weight.

4. A polymer blend of claim 1 wherein the polyolefin matrix is selected from polyethylene, polypropylene, polybutylene, and polymethylpentene.

5. A polymer blend of claim 4 wherein the polyolefin matrix is polypropylene.

6. A polymer blend of claim 5 wherein at least 70% of the polymer blend is polypropylene.

7. A polymer blend of claim 1 in which the core-shell modifier is selected from acrylic and MBS modifiers.

8. A polymer blend of claim 1 in which the copolymeric compatibilizer comprises:
   a. a non-polar polyolefin trunk selected from the group consisting of the group of polyethylene, polypropylene, polybutylene, poly (4-methylpentene), copolymers of said olefins with each other, and one or more copolymers of said olefins with minor amounts of 1-alkenes, vinyls, esters, vinyl chloride, methacrylic ester, and methacrylic acid;
   b. at least one methacrylate chain grafted with a covalent bond to said trunk having a weight ratio with said trunk from about 1 to 9 to about 4 to 1, said chain being a polymer-derived from at least about 80% of a monomer of a methacrylic ester of the formula $CH_2=C(CH_3)COOR$, where R is alkyl, aryl, substituted alkyl, substituted aryl, or substituted alkaryl, and less than about 20% of an acrylic or styrenic monomer copolymerizable with the methacrylic ester.

9. A polymer blend of claim 8 wherein the polyolefin trunk is polypropylene.

10. A polymer blend of claim 8 wherein the methacrylic ester is methyl methacrylate.

11. A polymer blend of claim 8 wherein the polyolefin trunk is polypropylene and the methacrylate chain is a methyl methacrylate polymer.

12. A polymer blend comprising from about 50 to about 98% polypropylene, about 40 to about 1% of a core-shell modifier selected from the group consisting of butadiene/methyl methacrylate and butyl acrylate/methyl methacrylate copolymers and from about 10 to about 1% of a copolymeric compatibilizer wherein said compatibilizer is a graft copolymer of polypropylene with a methacrylate chain grafted thereto.

13. An extruded, calendered or molded product prepared from the polymer blend of claim 1, 8, or 12.

* * * * *